United States Patent
Secor et al.

(10) Patent No.: US 12,409,650 B2
(45) Date of Patent: Sep. 9, 2025

(54) OPTICAL MEASUREMENT SYSTEM FOR REAL-TIME PROCESS MONITORING OF AEROSOL JET PRINTING

(71) Applicant: National Technology & Engineering Solutions of Sandia, LLC, Albuquerque, NM (US)

(72) Inventors: Ethan Benjamin Secor, Albuquerque, NM (US); Adam Wade Cook, Albuquerque, NM (US); Bryan James Kaehr, Albuquerque, NM (US); Rebecca Rosa Tafoya, Corrales, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 902 days.

(21) Appl. No.: 16/935,823

(22) Filed: Jul. 22, 2020

(65) Prior Publication Data
US 2022/0024206 A1 Jan. 27, 2022

(51) Int. Cl.

| | |
|---|---|
| *B05B 12/08* | (2006.01) |
| *B41J 2/125* | (2006.01) |
| *G01N 15/075* | (2024.01) |
| *G01N 15/1434* | (2024.01) |
| *B82Y 40/00* | (2011.01) |

(52) U.S. Cl.
CPC .......... *B41J 2/125* (2013.01); *B05B 12/082* (2013.01); *G01N 15/1434* (2013.01); *B82Y 40/00* (2013.01); *G01N 15/075* (2024.01)

(58) Field of Classification Search
None
See application file for complete search history.

(56) References Cited

U.S. PATENT DOCUMENTS

| | | | | |
|---|---|---|---|---|
| 5,335,000 | A * | 8/1994 | Stevens | ............ B41J 2/18 347/89 |
| 2009/0190128 | A1* | 7/2009 | Cerni | ........... G01N 15/1459 356/336 |
| 2011/0079220 | A1* | 4/2011 | Altobelli | ........... G01N 21/53 356/338 |

(Continued)

OTHER PUBLICATIONS

Everton, S.K. et al., "Review of In-Situ Process Monitoring and In-Situ Metrology for Metal Additive Manufacturing", Materials and Design (2016), vol. 95, pp. 431-445.

(Continued)

*Primary Examiner* — Binu Thomas
(74) *Attorney, Agent, or Firm* — Kevin W. Bieg (57) ABSTRACT

Aerosol jet printing is a popular digital fabrication method for flexible and hybrid electronics, but it lacks sophisticated process control architectures that would enable more widespread adoption in manufacturing environments. An optical measurement system can be used to track the aerosol density upstream of the printhead. For example, the measured optical extinction combined with the aerosol flow rate, is directly related to deposition rate and accurately predicts functional properties, for example electrical resistance. This real-time system offers a compelling solution for process drift and batch-to-batch variability, a valuable tool for more fundamental studies of the process science, and a viable technology to support real-time control of aerosol jet printing.

8 Claims, 12 Drawing Sheets

(56) References Cited

U.S. PATENT DOCUMENTS

| | | | | |
|---|---|---|---|---|
| 2014/0247450 | A1* | 9/2014 | Han | G01N 15/1012 |
| | | | | 356/338 |
| 2014/0339323 | A1* | 11/2014 | Bentvelsen | G01F 1/74 |
| | | | | 239/11 |
| 2015/0020804 | A1* | 1/2015 | Van Der Mark | G01N 15/0211 |
| | | | | 128/203.14 |
| 2016/0313233 | A1* | 10/2016 | Zangmeister | G01N 21/1702 |
| 2017/0191924 | A1* | 7/2017 | Pristinski | G01N 21/6428 |
| 2020/0309507 | A1* | 10/2020 | Lefebvre | G01B 7/20 |

OTHER PUBLICATIONS

Grasso, M. and Colosimo, B.M., "Process Defects and In Situ Monitoring Methods in Metal Powder Bed Fusion: A Review", Measurement Science and Technology (2017), 044005, 25 pages.

Khan, Y. et al., "A New Frontier of Printed Electronics: Flexible Hybrid Electronics", Advanced Materials (2020), 1905279, vol. 32, 29 pages.

Wilkinson, N.. et al., "A Review of Aerosol Jet Printing—A Non-Traditional Hybrid Process for Micro-Manufacturing", The International Journal of Advanced Manufacturing Technology, (2019), vol. 105, pp. 4599-4619.

Gu, Y. et al., "Inkwells for On-Demand Deposition Rate Measurement in Aerosol-Jet Based 3D Printing", Journal of Micromechanics and Microengineering (2017), 097001, vol. 27, 9 pages.

Smith, M. et al., "Controlling and Assessing the Quality of Aerosol Jet Printed Features for Large Area and Flexible Electronics", Flexible and Printed Electronics (2017), 015004, vol. 2, 11 pages.

Tafoya, R.R. and Secor, E.B., "Understanding and Mitigating Process Drift in Aerosol Jet Printing", Flexible and Printed Electronics (2020), 015009, vol. 5, 7 pages.

Salary, R. et al., "Online Monitoring of Functional Electrical Properties in Aerosol Jet Printing Additive Manufacturing Process Using Shape-From-Shading Image Analysis", Journal of Manufacturing Science and Engineering (2017), 101010, vol. 139, pp. 101010-1-101010-13.

Feng, J.Q., "Mist Flow Visualization for Round Jets in Aerosol Jet Printing", Aerosol Science and Technology (2018), vol. 53, pp. 45-52.

* cited by examiner

OPTICAL MEASUREMENT SYSTEM FOR REAL-TIME PROCESS MONITORING OF AEROSOL JET PRINTING

STATEMENT OF GOVERNMENT INTEREST

This invention was made with Government support under Contract No. DE-NA0003525 awarded by the United States Department of Energy/National Nuclear Security Administration. The Government has certain rights in the invention.

FIELD OF THE INVENTION

The present invention relates to aerosol jet printing and, in particular, to an optical measurement system for real-time process monitoring of aerosol jet printing.

BACKGROUND OF THE INVENTION

The rapid development of digital printing technologies in recent years promises to transform manufacturing. See S. H. Huang et al., Int. J. Adv. Manuf. Technol. 67, 1191 (2012); and T. D. Ngo et al., Compos. Part B: Eng. 143, 172 (2018). By applying digital fabrication methods to functional materials, these technologies offer rapid prototyping and customization in a digital environment that can leverage advanced algorithms and controls. However, serial production leads to significant challenges in quality assurance, particularly when the underlying fabrication technologies are vulnerable to stochastic processes leading to inconsistency. Across digital printing methods in general, there is a critical need for improved in-line process monitoring and control. See S. K. Everton et al., Mater. Des. 95, 431 (2016); and M. Grasso and B. M. Colosimo, Meas. Sci. Technol. 28, 044005 (2017).

Among digital printing technologies, aerosol jet printing (AJP) is well-suited for flexible and hybrid electronics fabrication. See Y. Khan et al., Adv. Mater. 32, 1905279 (2020); and N. J. Wilkinson et al., Int. J. Adv. Manuf. Technol. 105, 4599 (2019). AJP uses a focused aerosol stream of a liquid ink to deposit high resolution (20-50 µm), thin film (typically <10 µm) patterns of functional materials such as conductive nanoparticles and dielectric polymers. See E. B. Secor, Flex. Print. Electron. 3, 035002 (2018). Due to its digital, non-contact, and versatile nature, AJP has been demonstrated for the fabrication of a wide range of functional electronic device applications, including logic circuits, sensing, energy conversion, wireless communication, and energy storage. See C. Cao et al., Adv. Electron. Mater. 3, 1700057 (2017); M. Ha et al., Nano Lett. 13, 954 (2013); K. Parate et al., ACS Appl. Mater. Interfaces 12, 8592 (2020); S. Vella et al., Flex. Print. Electron. 4, 045005 (2019); M. Hörteis et al., Prog. Photovoltaics Res. Appl. 18, 240 (2010); C. Ou et al., Adv. Electron. Mater. 6, 1900720 (2019); D. Jahn et al., Adv. Mater. Technol. 3, 1700236 (2018); E. S. Rosker et al., ACS Appl. Mater. Interfaces (2020); and M. S. Saleh et al., Addit. Manuf. 23, 70 (2018). However, despite its popularity in research environments, more widespread adoption of AJP is hindered by poor process consistency. See Y. Gu et al., J. Micromech. Microeng. 27, 097001 (2017); and M. Smith et al., Flex. Print. Electron. 2, 015004 (2017).

Recent efforts have introduced approaches to mitigate process drift or provide process monitoring capabilities during AJP. Previously, it was demonstrated that substantial process drift arises due to variations in the cartridge loading alone, independent of ink composition drift, and a continuous flow cartridge was introduced to address both sources in a passive manner. See R. R. Tafoya and E. B. Secor, Flex. Print. Electron. 5, 015009 (2020). To evaluate the ink deposition rate in near real-time, Gu et al. introduced a strategy for manually calibrating the deposition rate using well-defined microfabricated inkwells. See Y. Gu et al., J. Micromech. Microeng. 27, 097001 (2017). Moreover, Salary et al. demonstrated online process monitoring based on optical characterization of lines following deposition. See R. Salary et al., J. Manuf. Sci. Eng. 139, 101010 (2017). While these studies offer strategies for mitigating inconsistency, none have provided robust real-time characterization for process control in an adaptable and generalizable framework.

SUMMARY OF THE INVENTION

The present invention is directed to an aerosol jet printer comprising an optical measurement system which allows real-time optical characterization of an aerosol stream. The optical measurement is predictive of functional properties with far greater accuracy than traditional process parameters, such as atomizer voltage and gas flow rates. In particular, the aerosol optical density, tracked by the optical extinction, combined with aerosol flow rate offers a real-time metric with excellent predictive accuracy for sample conductance, aligned with theoretical considerations. This system enables process control in production environments, more thorough insight to investigate the fundamental science of the process, and real-time characterization of a physically relevant parameter to enable closed-loop control of aerosol jet printing.

BRIEF DESCRIPTION OF THE DRAWINGS

The detailed description will refer to the following drawings, wherein like elements are referred to by like numbers.

FIG. 5A illustrates a framework for testing a process monitoring system. The illustration describes the relevant process parameters during printing, indicating that the controlled parameters do not always directly correlate with those that are physically relevant.

FIGS. 6A-6H show experiment results for the individual cartridge fill levels based on standard parameters and the optical metric. FIGS. 6A-6D show sample conductance plotted against aerosol flow rate for each fill level. The color scale in these figures indicates the atomizer voltage.

FIG. 8B shows microscopy images of deposited graphene films. In cases with high deposition rate, in general corresponding to a high aerosol flow rate and cartridge fill level, deposition is a solvent-rich state allows flakes to form a densely packed film with high conductivity. In cases exhibiting poor atomization, corresponding to generally low aerosol flow rate and low cartridge level, the material is deposited in a drier state, leading to a porous film with impaired electrical conductivity.

FIGS. 10A-10C show experimental results using the optical measurement system for closed-loop control of an aerosol jet printer.

FIGS. 11A and 11B illustrate a manual feedback-based printing experiment design and results.

DETAILED DESCRIPTION OF THE INVENTION

Figure 1:
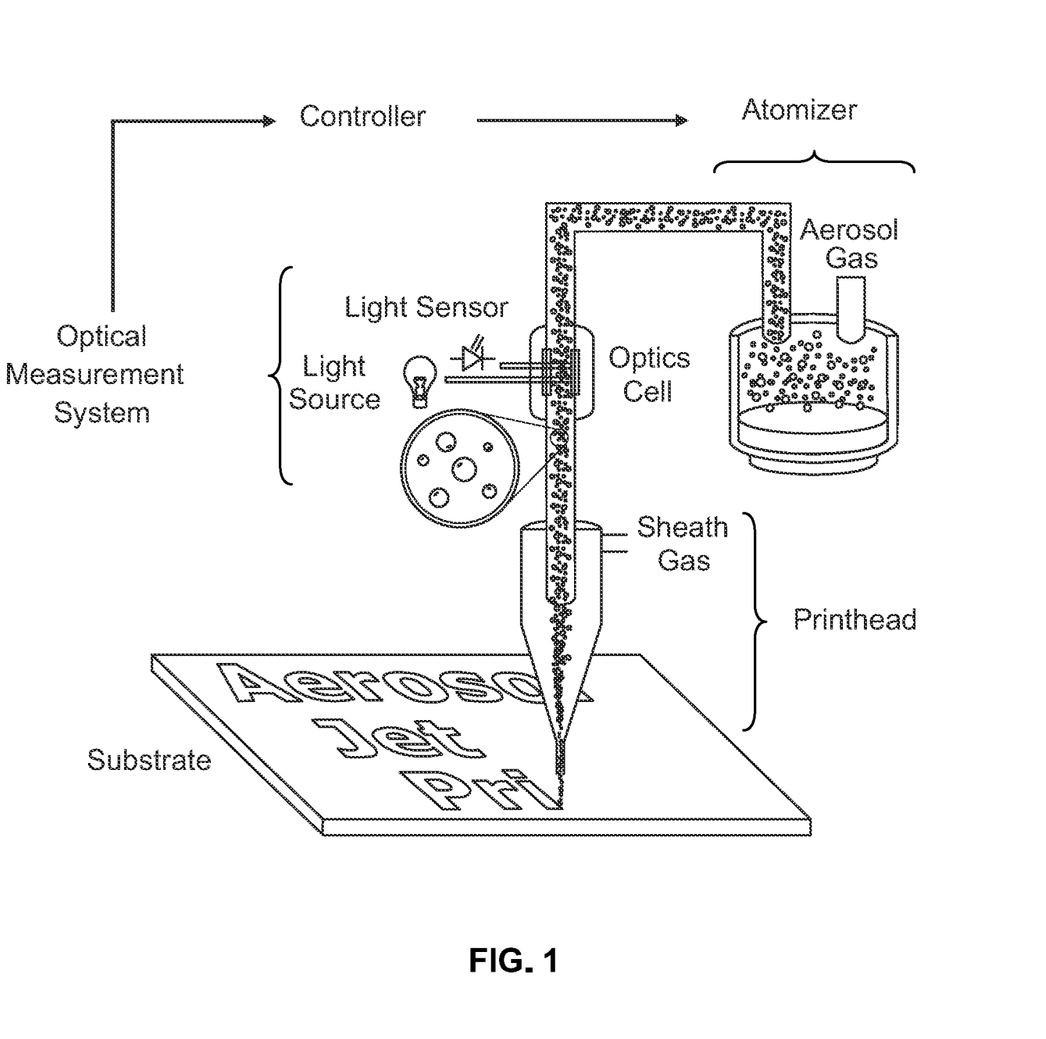
FIG. 1 is a schematic illustration of an optical measurement system for real-time process monitoring, which uses a printhead with an optics cell to characterize the aerosol flow upstream of the printhead.

FIG. 1 is a schematic illustration of a real-time optical measurement system for process monitoring of AJP. During AJP, a liquid ink is atomized to produce micron-scale droplets, which are entrained in a gas flow and carried to a printhead. For example, the atomizer can be an ultrasonic atomizer or a pneumatic atomizer. For example, the printhead can be a modified Integrated Deposition System, Inc. (IDS) NanoJet™ printhead. In this printhead, an annular sheath gas collimates the aerosol stream and accelerates it through a nozzle to impact upon a substrate. By moving the substrate relative to the printhead with a numerical control motion system, patterns can be defined in software and printed with feature sizes as fine as ~10 μm.

According to the present invention, the aerosol jet printer further comprises an optical measurement system to enable in-line optical scattering or extinction measurements of the aerosol stream upstream of the printhead. The optical measurement system comprises a sensor and suitable optical configuration to detect a measurable response due to changes in the aerosol stream. The response can be a light scattering and/or transmission measurement of the aerosol stream. The system can comprise: (1) A light source, which can be but does not need to be broadband. For example, the light source can comprise a broadband tungsten-halogen lamps with fiber-coupled output power of 1-10 mW. However, any light wavelength that can interact with the aerosol droplets, such as narrowband light from a light-emitting diode, can be used. Further, higher or lower light intensities can be used. (2) An optics cell containing one of more transparent optical windows. For example, the optical windows can comprise quartz windows. For use with aerosol jet printing, the optics cell should be air-tight. (3) A light sensor, which can be but does not need to be spectrally resolved. For example, the light sensor can be a photodiode or a spectrometer detector that is matched to the light wavelength used. (4) Waveguide or fiber optic components to connect light between the components.

Figure 2A:
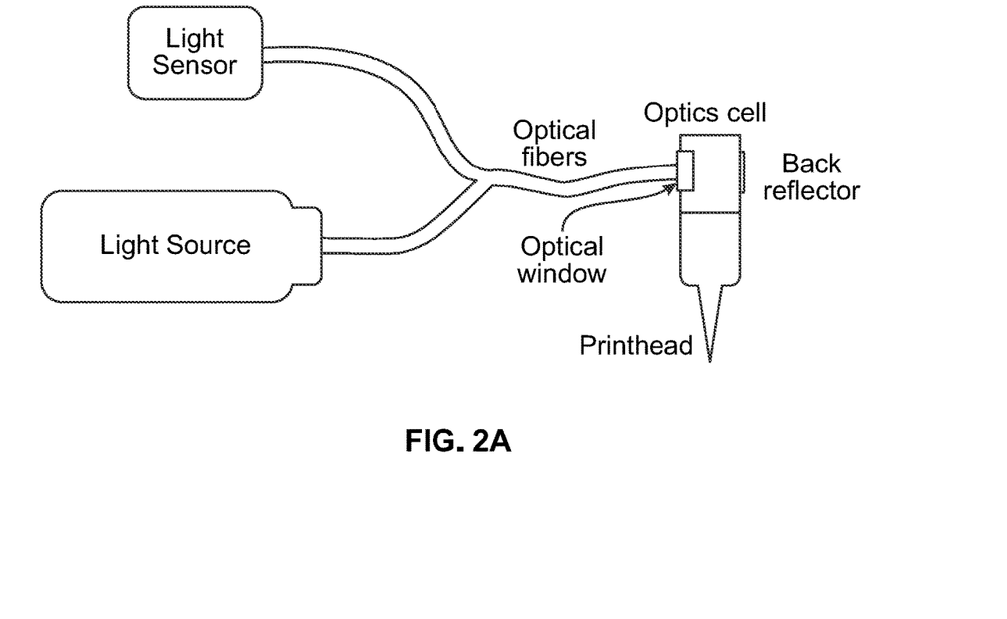
FIG. 2A is a schematic illustration of an optical measurement system comprising a double-pass optics cell with a back reflector.
Figure 2B:
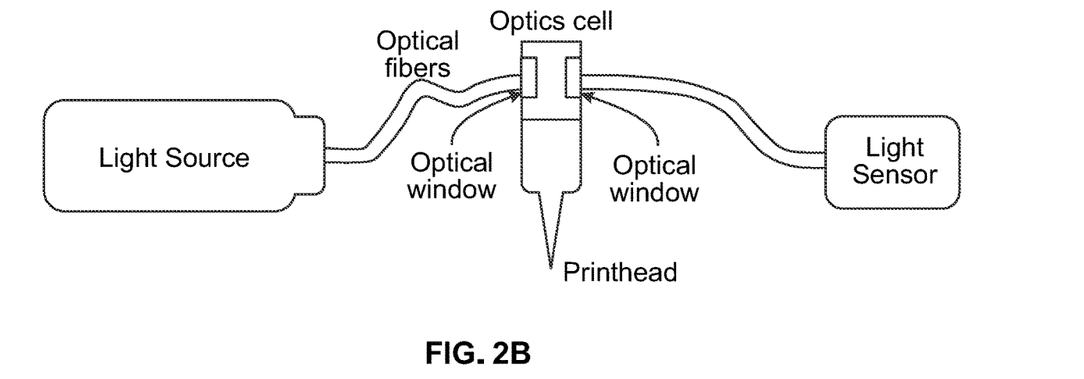
FIG. 2B is a schematic illustration of an optical measurement system comprising a single-pass optics cell with front and back optical windows.

FIG. 2A is a schematic illustration of an optical measurement system comprising a double-pass optics cell wherein light from the light source enters the optics cell through a transparent front optical window, interacts with the aerosol stream in the cell, reflects off a back reflector, passes back through the cell a second time, and exits out through the front optical window for measurement of transmitted light by a light sensor. FIG. 2B is a schematic illustration of an optical measurement system comprising a single-pass optics cell wherein light from the light source enters the optics cell through a transparent front optical window, interacts with the aerosol stream, and exits the optics cell through a transparent back optical window for measurement of transmitted or scattered light by a light sensor.

Figure 3A:
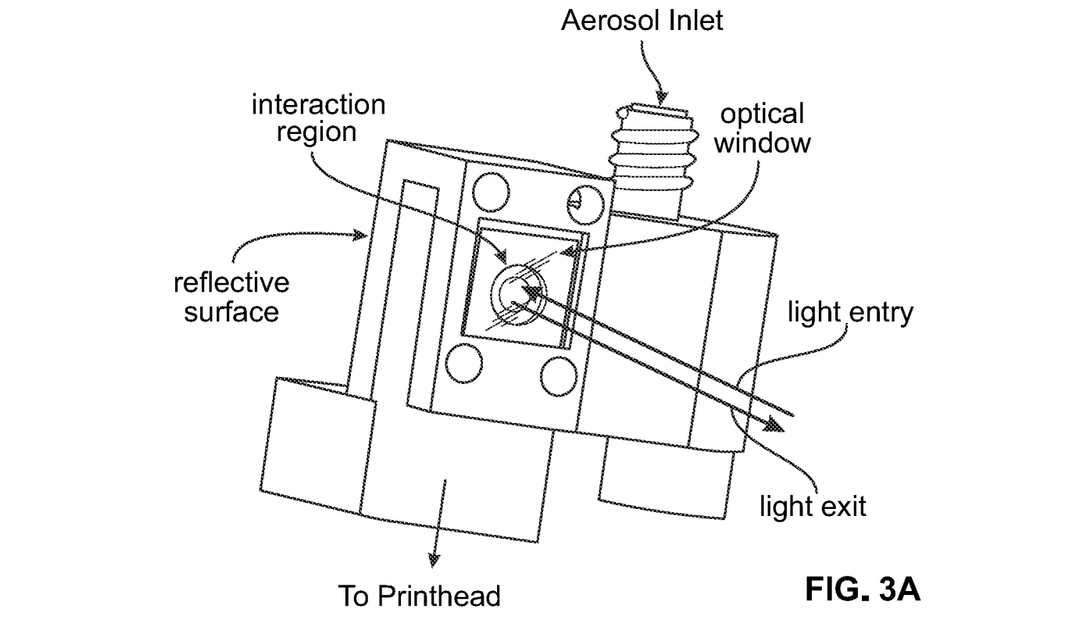
FIG. 3A is a solid model illustration of an exemplary optics cell that can be used with the optical measurement system shown in FIG. 2A.
Figure 3B:
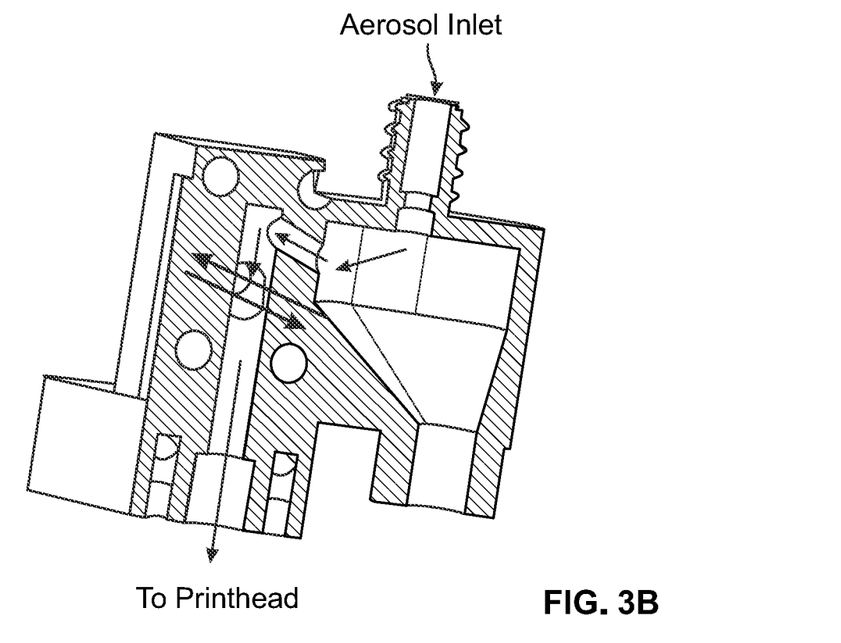
FIG. 3B is a cutaway view of the optics cell.

FIG. 3A is a solid model illustration of an exemplary optics cell that can be used with the optical measurement system shown in FIG. 2A. FIG. 3B is a cutaway view of the optics cell, showing the flow path of the aerosol stream through the exemplary optics cell. An aerosol stream from an atomizer enters the cell through an aerosol inlet. Light enters the cell through a transparent optical window, interacts with the aerosol stream in an interaction region, reflects off a back reflective surface, interacts with the aerosol stream a second time, and exits back out through the front optical window. The aerosol stream then exits the cell to the printhead.

Figure 5A:
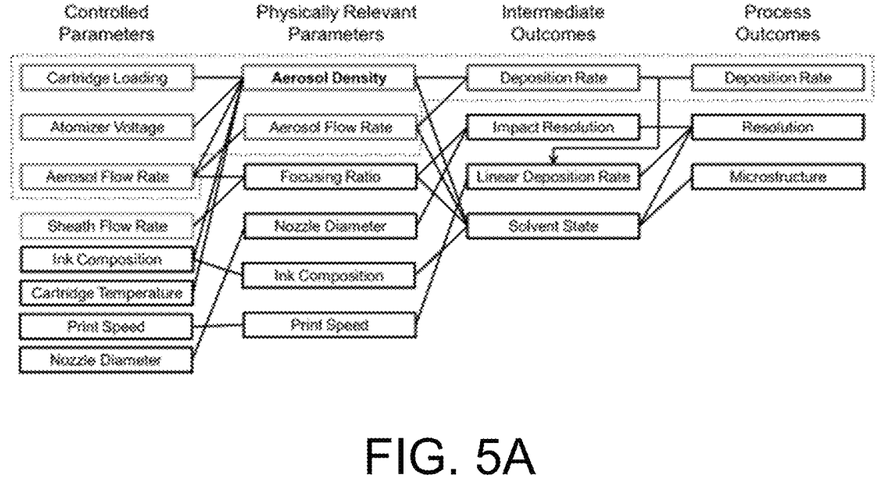

During the aerosol jet printing process, changes in ink atomization lead to downstream variation in the deposition rate, which can have a secondary effect on print resolution. See R. R. Tafoya and E. B. Secor, Flex. Print. Electron., to be published. This leads to severe inconsistency, including both sample-to-sample (process drift) and batch-to-batch variability. The dry deposition rate (volume of solids deposited per unit time, measured following printing and curing) can be used to describe variability. In principle, the dry deposition rate can be described as:

$$r_{dep} = v_a f_a \chi_s (1-\varphi) \eta_{imp} \tag{1}$$

where $r_{dep}$ is the deposition rate, $v_a$ is the aerosol density (volume fraction), $f_a$ is the aerosol flow rate, $\chi_s$ is the solids volume fraction of the ink, $\varphi$ is the film porosity, and $\eta_{imp}$ is the impaction efficiency. Although the impaction efficiency can change at extreme flow rate conditions, under normal operation this should not vary considerably. See E. B. Secor, *Flex. Print. Electron.* 3, 035007 (2018). Similarly, film porosity is likely to be fairly consistent under normal conditions, with variation expected at extremes of the focusing ratio, or sheath:aerosol flow rate ratio. Because the ink solids fraction is fixed for a particular composition, this too will not likely be a primary contributor to process variability. This leaves two principal parameters, the aerosol flow rate and the aerosol density. While the aerosol flow rate is set directly and controlled carefully, the aerosol density is a result of complex interactions related to ink atomization. As this was implicated in earlier studies to understand process drift, the aerosol density is a physically relevant parameter with poor control, providing a compelling parameter for in-line monitoring. See R. R. Tafoya and E. B. Secor, *Flex. Print. Electron.* 5, 015009 (2020). This is illustrated in FIG. 5A, which distinguishes physically important parameters from those that are directly and easily user controlled. The illustration describes the relevant process parameters during printing, indicating that the controlled parameters do not always directly correlate with those that are physically relevant.

Figure 4A:
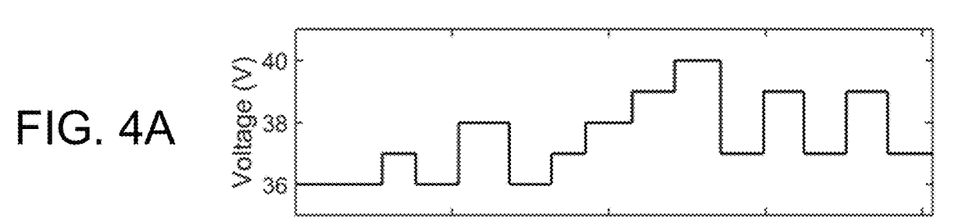
FIGS. 4A-4C are graphs of atomizer voltage, the real-time measurement of optical extinction, and the final film thickness following curing for a series of printing experiments.
Figure 4B:
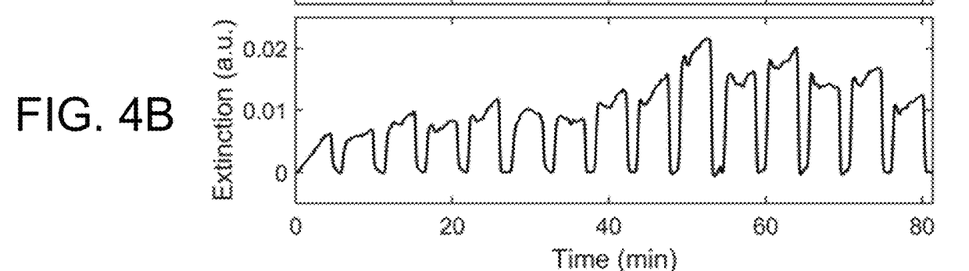
Figure 4C:
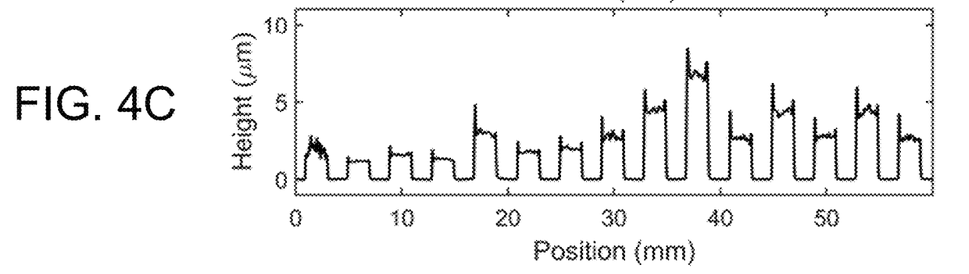

Previous work to visualize the aerosol stream exiting the print nozzle revealed substantial optical scattering from the micron-scale droplets, raising the prospect for a quantitative measurement system. See J. Q. Feng, *Aerosol Sci. Technol.* 53, 45 (2018). To test whether the optical measurement system of the present invention is sensitive enough to detect variations in the optical density of the aerosol stream upstream of the printhead, a proof-of-concept experiment was performed in which a series of films was printed with varying atomizer voltage. FIGS. 4A-4C show correlated data for the atomizer voltage (i.e., using an ultrasonic atomizer), the real-time measurement of optical extinction, and the final film thickness following curing for a series of printed samples, respectively. The optical extinction measurement indicates clear changes at the beginning and end of each printed sample (the aerosol flow was zeroed after each sample to return to baseline). In addition, fine features of the data can be observed, such as the cartridge equilibration while printing the first sample, which results in a rougher film. The equilibration is attributed to thermal changes in the ink, along with some time to saturate the cartridge volume with aerosol droplets. Moreover, post hoc analysis of the thickness for the films, shown in FIG. 4C, indicates a correlation with the real-time optical measurement, shown in FIG. 4B. This supports the viability of this measurement configuration, not only to detect discrete or qualitative changes in the aerosol stream (i.e., on/off operation), but to measure continuous, quantitative changes that can be predictive of functional properties downstream.

Figure 5B:
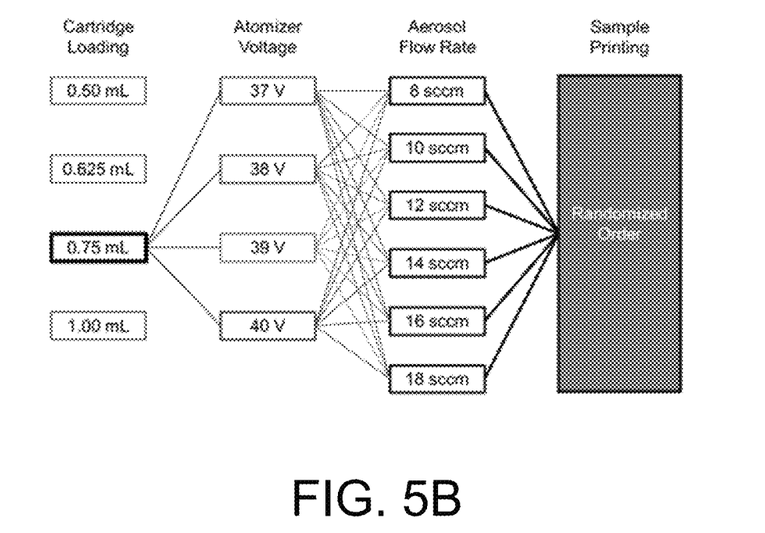
FIG. 5B illustrates an experimental design to test the optical measurement system, with a primary focus on the deposition rate. Cartridge loading, atomizer voltage, and aerosol flow rate were investigated, and for each cartridge loading the order of experiments was randomized to control for drift in ink composition.
Figure 5C:
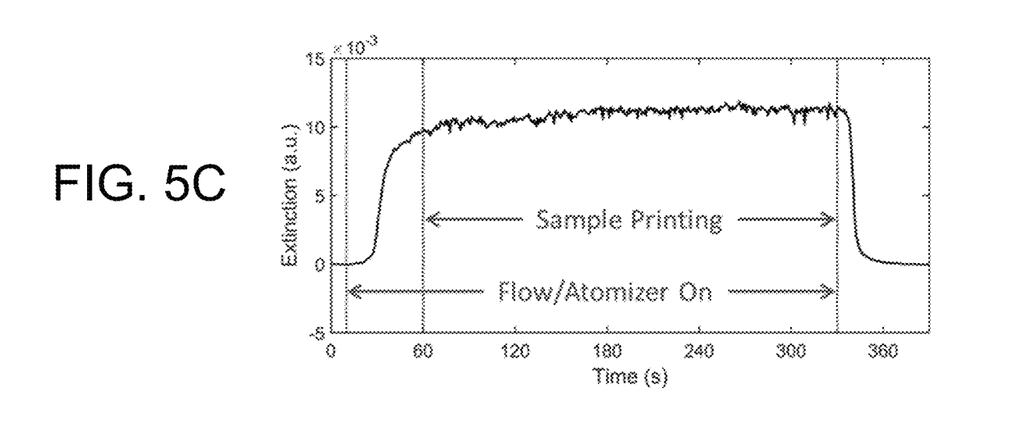
FIG. 5C shows representative optical data for a single sample, showing the experimental sequence.

As shown in FIG. 5A, the aerosol density or atomization efficacy of the ink is influenced by a wide range of parameters, including the cartridge fill level, atomizer voltage, aerosol flow rate, ink composition, cartridge temperature, and pressure. The primary process outcome resulting from the aerosol density is the deposition rate, although the aerosol density is expected to also have indirect effects on the resolution and microstructure. Therefore, the region of interest is defined by the dashed line in FIG. 5A. A series of experiments was developed, each for a defined initial cartridge loading from 0.5-1.0 mL, as shown in FIG. 5B. The cartridge temperature, substrate temperature, print nozzle diameter, and print speed were maintained at 20° C., 60° C., 200 µm, and 2.5 mm/s, respectively. In each case, 4 atomizer voltages and 6 aerosol flow rates were used in a combinatorial manner, resulting in 24 printed samples with a randomized order (the sheath flow rate was adjusted to maintain a focusing ratio of 3 for all experiments). Moreover, during printing the cartridge was cleaned and refilled after each set of 8 samples to mitigate composition drift of the ink, and an initialization print for five minutes was performed to ensure equilibration of the cartridge prior to printing any samples. For each sample, the atomizer and aerosol flow were activated ~50 seconds prior to the start of printing, and deactivated immediately following printing, to provide a baseline for the optical measurement, as shown in FIG. 5C. Some drift in the baseline was evident, likely due to changes in the ambient temperature, so baseline subtraction was performed during analysis.

Figure 5D:
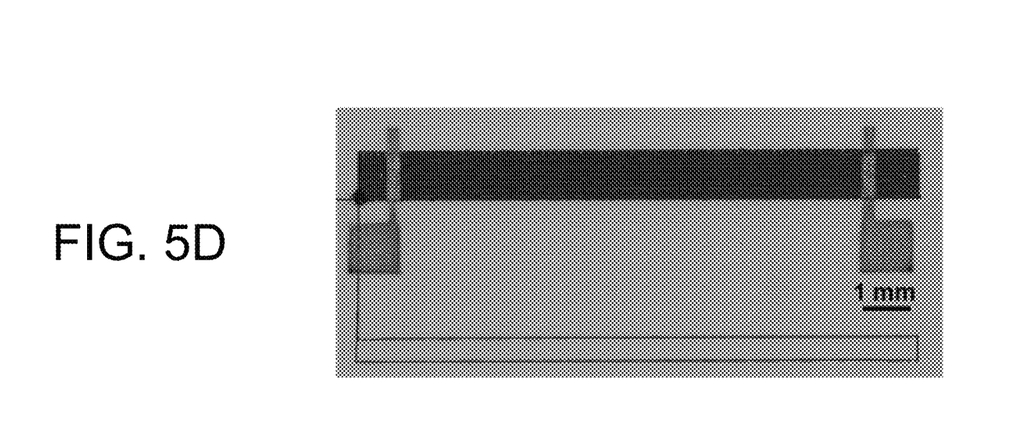
FIG. 5D is a microscopy image showing the layout of a single test sample.
Figure 6A:
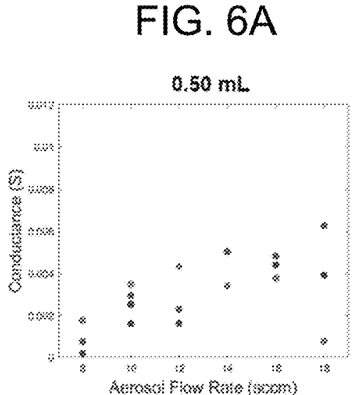
Figure 6B:
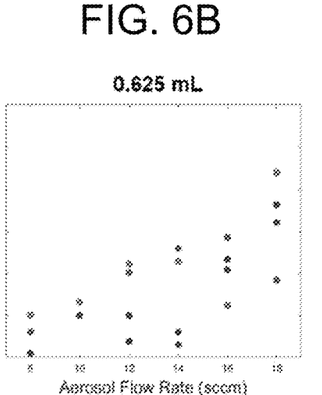
Figure 6C:
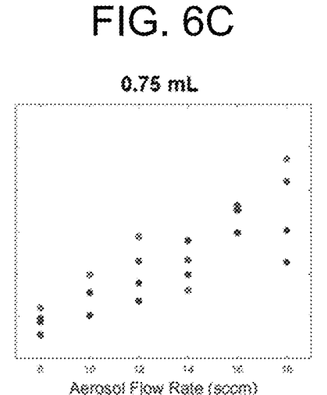
Figure 6D:
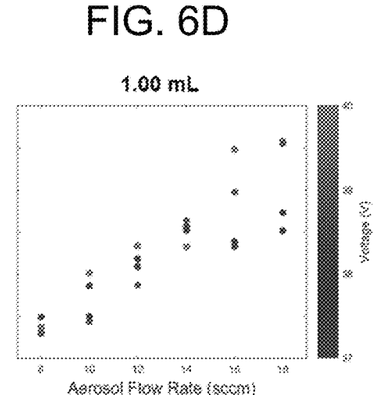
Figure 6E:
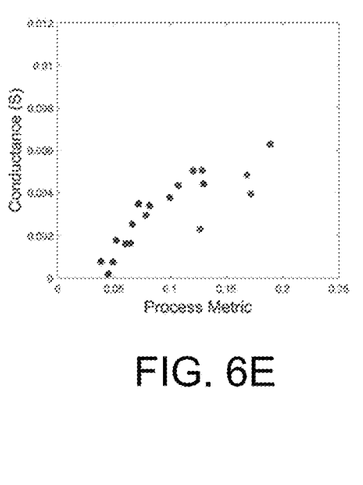
FIG. 6E-6H show sample conductance plotted against the process metric, the product of aerosol flow rate and average optical extinction. The color in these figures indicates the order of sample preparation.
Figure 6F:
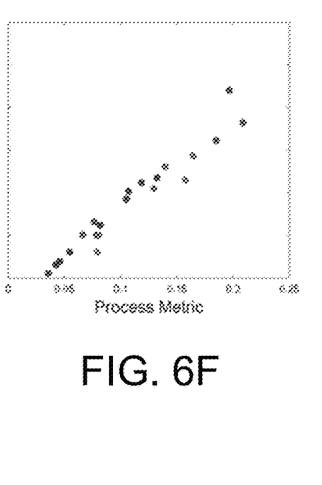
Figure 6G:
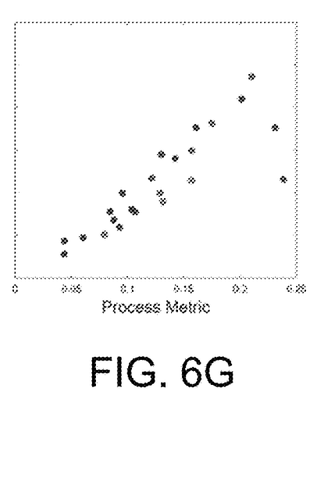
Figure 6H:
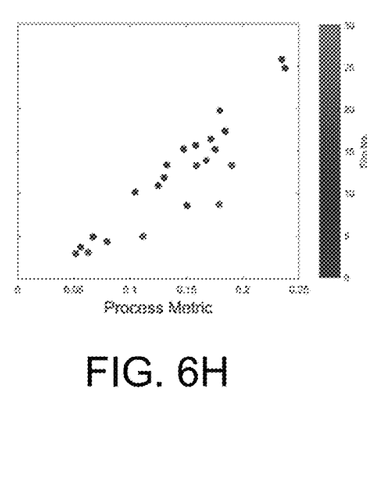

For these experiments, a graphene ink was used containing 1% w/v graphene/ethyl cellulose in 9:1 ethanol:terpineol. To prepare the ink, a powder containing graphene with ethyl cellulose was prepared following previously established protocols. See E. B. Secor et al., *Adv. Mater.* 27, 6683 (2015); and E. B. Secor et al., *J. Phys. Chem. Lett.* 4, 1239 (2013). A solvent bubbler upstream of the cartridge was used to mitigate composition drift. As an ethanol-based ink, even with the solvent bubbler the high vapor pressure of the solvent can lead to rapid drying within the cartridge. By using this graphene ink, the optical measurement can be correlated to a functional property, namely resistance, which is directly linked to the amount of material deposited (whereas thickness could vary depending on film microstructure). A standard resistor pattern was used, with a 1×12 mm bar of graphene and silver contact pads printed on top, as shown in FIG. 5D. Following printing, all samples were cured on a hotplate at 325° C. for 1 hour prior to characterization. Four-point probe resistance measurements were collected, along with film cross section area and microscopy images. In total, 96 samples were printed and characterized for these experiments.

While users of AJP are typically constrained to calibration based on the directly controlled parameters (e.g., atomizer voltage and aerosol flow rate), these are insufficient to handle variability in ink atomization. This is illustrated in FIGS. 6A-6D, which show the conductance of graphene films plotted as a function of aerosol flow rate for different cartridge fill levels, with the atomizer voltage indicated by color. Some correlation is observed, as the aerosol flow rate is, in principle, directly related to the deposition rate, as indicated in Eq. (1). When the conductance is instead plotted against the product of average optical extinction and aerosol flow rate, referred to hereafter as the process metric, the correlation is clearer, as shown in FIGS. 6E-6H. This is particularly the case when considering data from different cartridge loading levels. In practice, the cartridge fill level will change during printing barring manually-intensive efforts to clean and refill the cartridge at brief, regular intervals. As such, a reliable metric needs to be consistent regardless of the ink volume. To investigate this further, data from the four experiments was aggregated.

With the aggregated data from all 96 samples, the failure of traditional process parameters to predict the functional properties was clear. In particular, the real-time measurement proved to be a far better indicator of aerosol density than user-controlled process parameters, such as atomizer voltage. Using the real-time optical data, the conductance values all fall on a common trendline regardless of the cartridge loading. A correlation matrix showing the primary predictors for all data points was generated. While the aerosol flow rate did have a strong positive correlation ($r^2$) of 0.74, due to its direct relation to deposition rate, the process metric was a better predictor, with a correlation coefficient of 0.88.

Figure 7A:
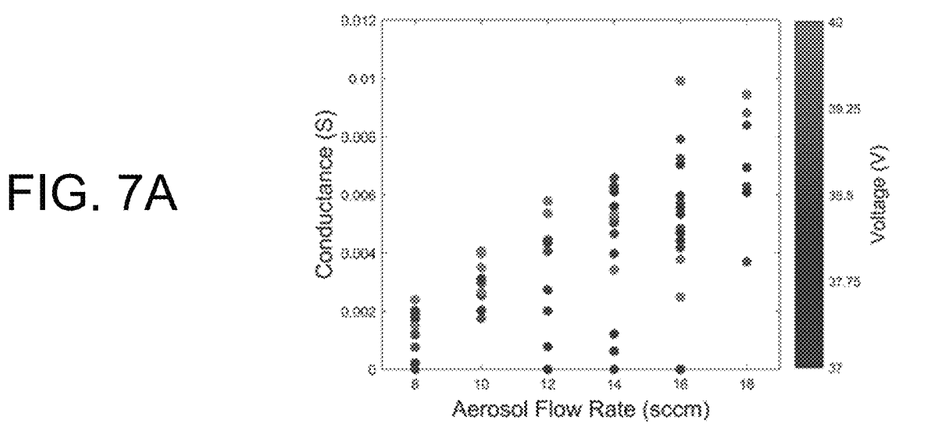
FIG. 7A is a graph of sample conductance plotted against aerosol flow rate for the subset of 60 samples, again showing poor predictive accuracy based on standard process parameters.
Figure 7B:
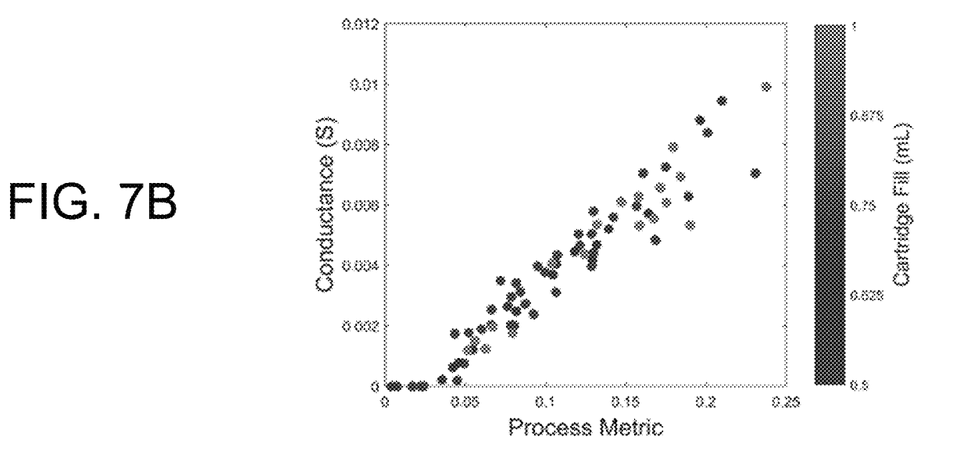
FIG. 7B is a graph of sample conductance plotted against the process metric, the product of aerosol flow rate and average optical extinction, with the color indicating the cartridge fill volume.
Figure 7C:
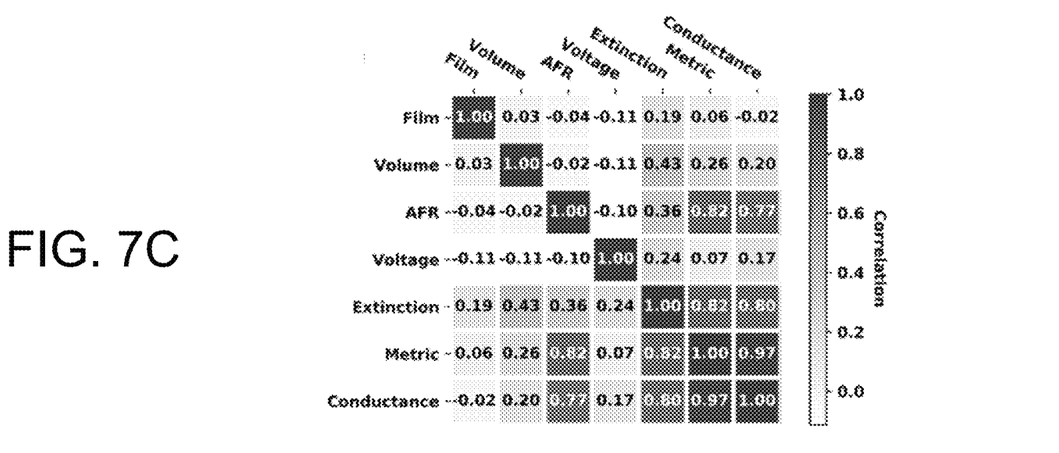
FIG. 7C is a two-way correlation matrix for the data subset including the relevant process parameters of film number, cartridge fill volume, aerosol flow rate (AFR), atomizer voltage, optical extinction, process metric, and conductance. The values and color scale correspond to the linear correlation, $r^2$, revealing an outstanding fit of 0.97 for the process metric.

When only the first 5 samples in each set are considered (60 samples total), the traditional process parameters of voltage and aerosol flow rate continue to be poor predictors, as shown in FIG. 7A. However, for only samples printed with reasonably fresh ink (~30 minutes printing), the conductance features a clear, approximately linear correlation with the process metric, regardless of the cartridge fill level, as shown in FIG. 7B. The two-way correlation matrix for this data set indicates an outstanding fit for the process metric, with a coefficient of 0.97, as shown in FIG. 7C. This establishes the predictive accuracy of this real-time optical process monitoring capability for functional properties. Moreover, while this data set maintained a focusing ratio of 3 for consistency, an independent experiment confirmed the applicability of this linear fit even when the focusing ratio is varied.

Figure 8A:
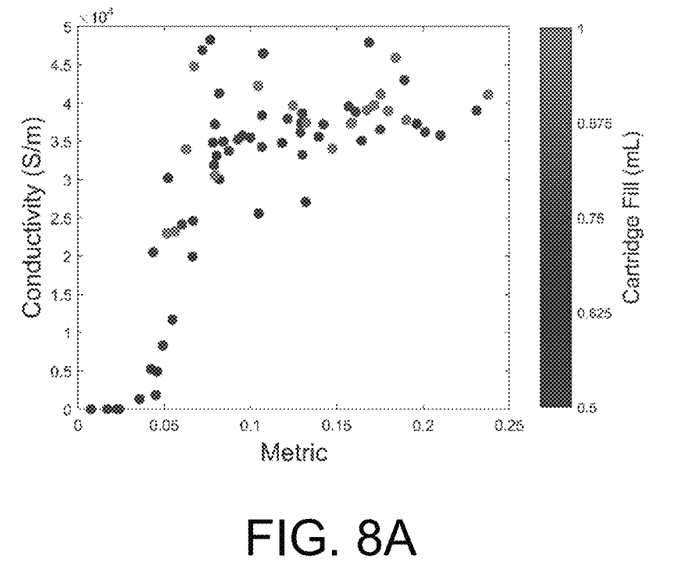
FIG. 8A is a graph of sample conductivity plotted as a function of the process metric (product of aerosol flow rate and average optical extinction), showing a transition between no conductivity, highly variable conductivity, and plateau as the value of the process metric increases.
Figure 8B:
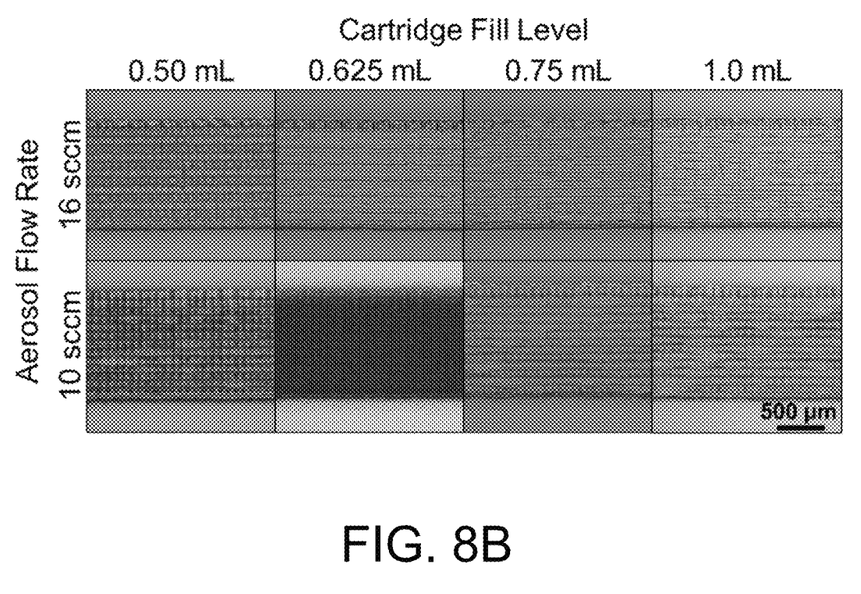

The process metric provides insight into the printing process beyond conductance alone. In particular, when the film conductivity is plotted against the product of aerosol flow rate and optical extinction, a clear trend emerged, as shown in FIG. 8A. At very low values of the real-time process metric, films were not conductive. In an intermediate transition zone, the conductivity exhibited wide variability as it approaches a plateau. For high values of the metric, corresponding to high deposition rates, the conductivity reached a stable plateau near 35,000 S/m. Under these conditions, deposition of a wet film allowed flakes to form a dense microstructure, as compared to dry deposition in a solvent-poor state, as shown in FIG. 8B. This insight based on the process metric therefore allows improved print optimization based on film conductivity, related to microstructure, rather than conductance alone, which could be relevant for applications in which porosity and surface area are important. See L. Li et al., *Adv. Energy Mater.* 6, 1600909 (2016); and E. B. Secor et al., *J. Phys. Chem. C* 122, 13745 (2018).

Figure 9A:
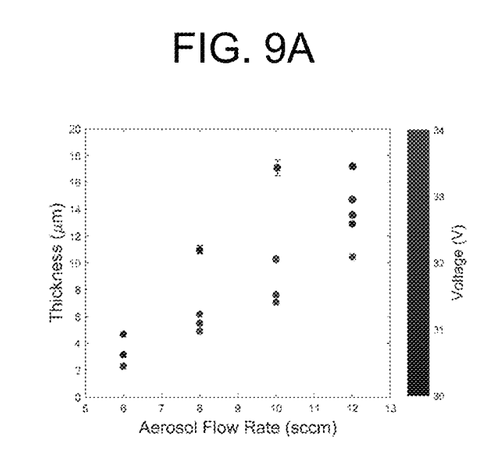
FIG. 9A is a graph showing the variation in thickness with standard parameters of flow rate and voltage for a PMMA ink.
Figure 9B:
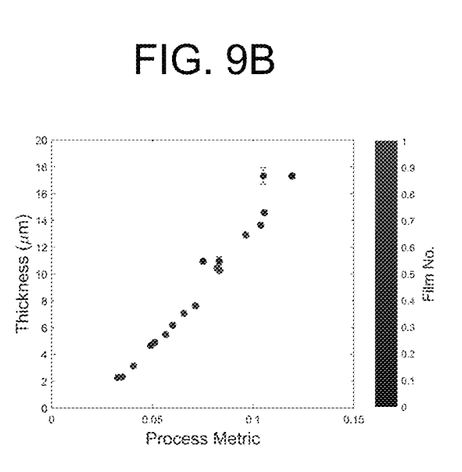
FIG. 9B is a graph showing the variation with the process metric, the product of aerosol flow rate and optical extinction.
Figure 9C:
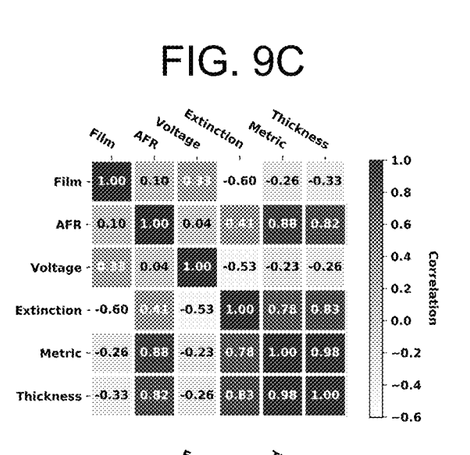
FIG. 9C is a two-way correlation matrix summarizing the relationships between process variables for the PMMA ink.
Figure 9D:
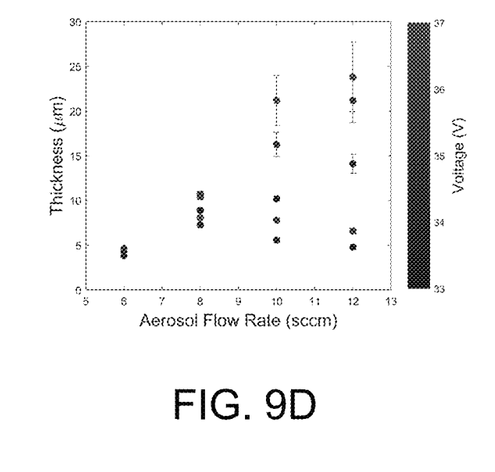
FIG. 9D is a graph showing the variation in thickness with standard parameters of flow rate and voltage for a magnetite nanoparticle ink.
Figure 9E:
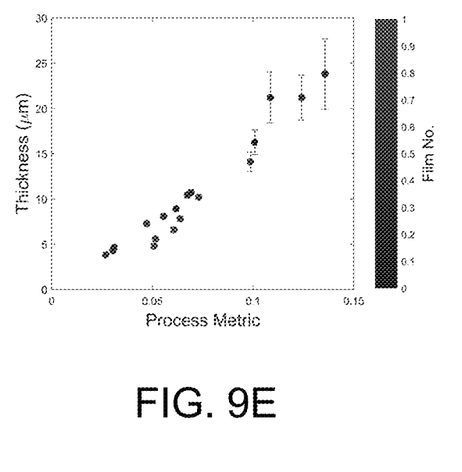
FIG. 9E is a graph showing the variation with the process metric, the product of aerosol flow rate and optical extinction.
Figure 9F:
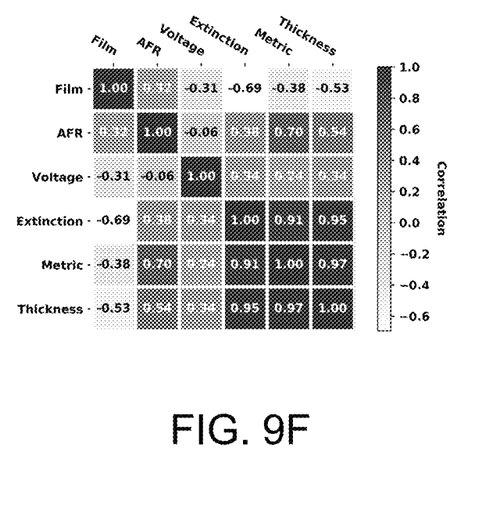
FIG. 9F is a two-way correlation matrix summarizing the relationships between process variables for the magnetite nanoparticle ink.

Because the optical response depends on light scattering from aerosol droplets, the results for graphene can be generalized to other inks. Indeed, any ink suitable for AJP can be used, including inks comprising conductive, dielectric, magnetic, polymeric, metallic, ceramic, or carbon nanoparticles. This was validated with poly(methyl methacrylate) (PMMA) and magnetite nanoparticle inks. For the PMMA ink, PMMA ($M_w$~15,000) was dissolved at a concentration of 10 mg/mL in a 9:1 mixture of xylenes and terpineol by mixing at room temperature. The magnetite ink was obtained from UT Dots, Inc. A thick paste containing magnetite nanoparticles (UTD-MI-SD) was diluted 1:4 w/w with xylenes. This stock solution was mixed with xylenes and terpineol in a 5:31:4 v/v ratio (stock:xylenes:terpineol) to prepare the ink. For these non-conductive inks, film thickness was used as the post-hoc indicator of the deposition rate. Similar experiments were conducted varying both the atomizer voltage and the aerosol flow rate, maintaining a focusing ratio of 3. PMMA, in particular, was selected due to its optical transparency, to demonstrate that this method works based on scattering, and is applicable in the absence of optical absorption and, therefore, generalizable. As shown in FIGS. 9B and 9E, and suggested by Eq. (1), the product of the optical extinction and aerosol flow rate shows a highly linear relationship with the thickness measured following printing. Notably, during these experiments the ink was not replaced over 2 hours of printing. There was significant drift in the deposition rate over time, but because the ink composition varies minimally the relation between thickness and the process metric was maintained with high accuracy, with a correlation coefficient of 0.98 and 0.97 for PMMA and magnetite inks, respectively, as shown in FIGS. 9C and 9F.

The invention builds on a fundamental understanding of the process, including sources of process drift. It leverages this scientific basis to identify the primary, physically-relevant parameter that is not directly controlled in the process, namely the aerosol density. The printhead and optical measurement system of the present invention can track this parameter in real time. The invention offers clear advantages for reducing within- and between-batch variability in production environments, overcoming a clear practical challenge for more widespread adoption of AJP. This process can use the average optical extinction measured during printing. However, this optical signal can be useful on shorter timescales, or without a baseline. In particular, the short-term variability of the optical signal, which can be measured without stopping printing to collect a baseline, is also a useful, real-time process metric. This tool results in a feature-rich data record for print validation, which can be used to support machine learning models for, among other purposes, quality assurance. Moreover, it provides insight into physical mechanisms not possible with post hoc characterization alone, offering a path to improved process understanding by offering a direct measure of the aerosol state within the printhead. As a noninvasive, real-time process monitoring capability with straightforward automation, this enables closed-loop control and more sophisticated digital printing architectures.

Therefore, the invention can further comprise a closed-loop feedback controller that uses a process metric to control at least one process parameter in real time. In general, the response can include changes to the atomizer voltage or duty cycle (e.g., for an ultrasonic atomizer), and/or temperature, the cartridge fill level or ink composition, the gas flow rates for the aerosol, sheath, and/or virtual impactor (e.g., for a pneumatic atomizer), and the print speed. Moreover, the optical measurement can be used as a binary indicator to shut down printing in an automated manner if a problem is detected.

Figure 10A:
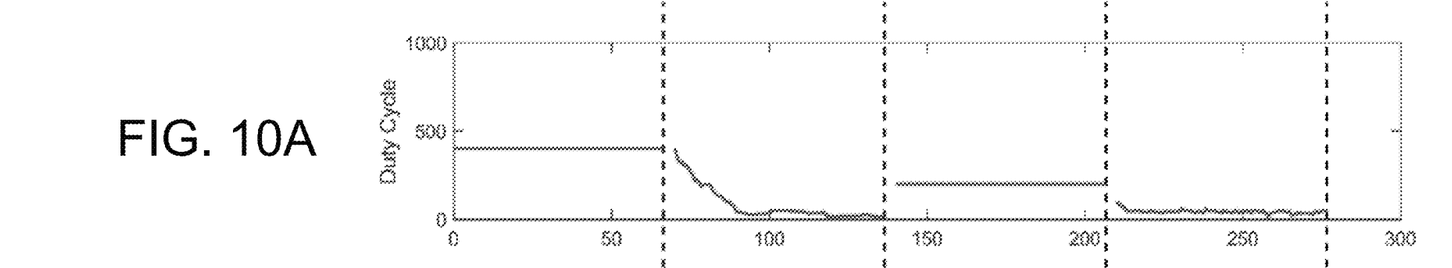
FIG. 10A is a graph of the duty cycle, the controlled process parameter, as a function of time.
Figure 10B:
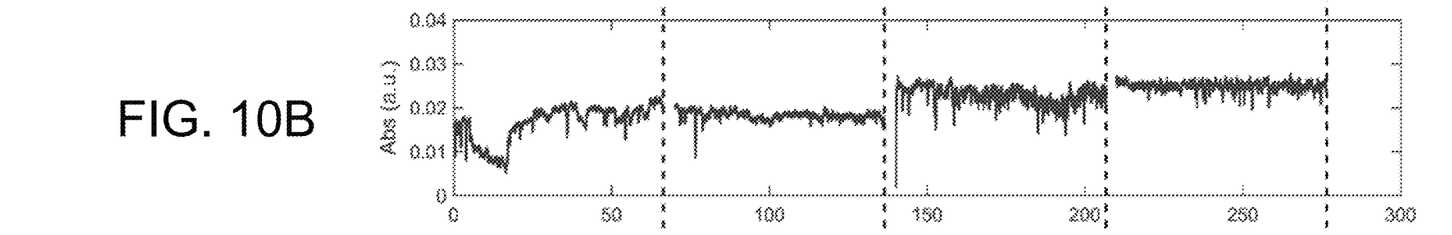
FIG. 10B is a graph of the optical absorption.
Figure 10C:
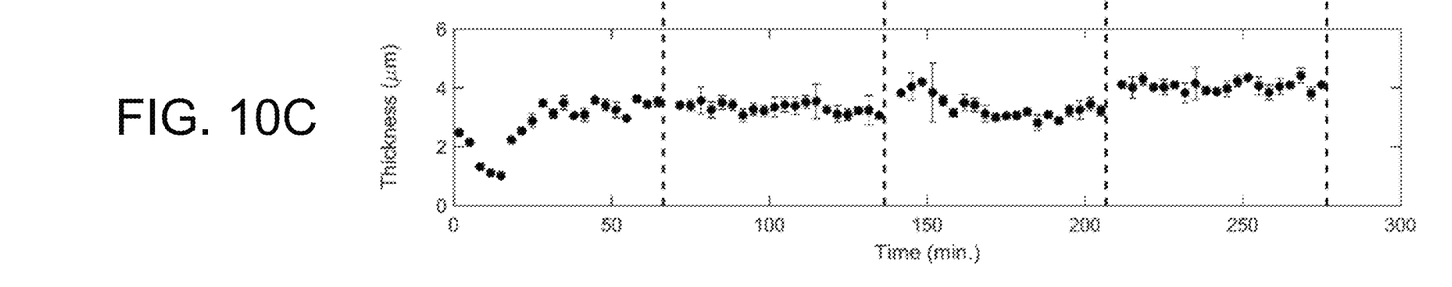
FIG. 10C is a graph of the deposited film thickness.
Figure 11A:
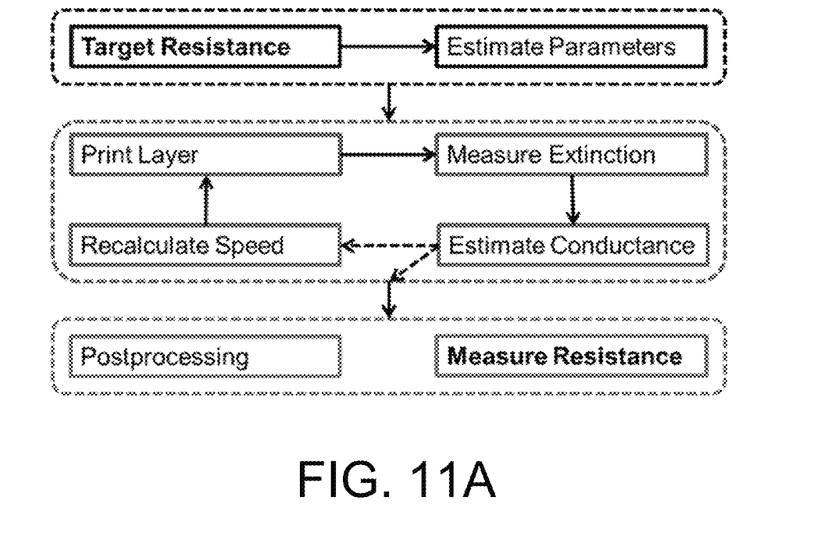
FIG. 11A is an illustration of an experiment design to test printing of multilayer resistors, in which the print speed can be modified after each layer to achieve a targeted resistance value. In this example, only two layers were used.
Figure 11B:
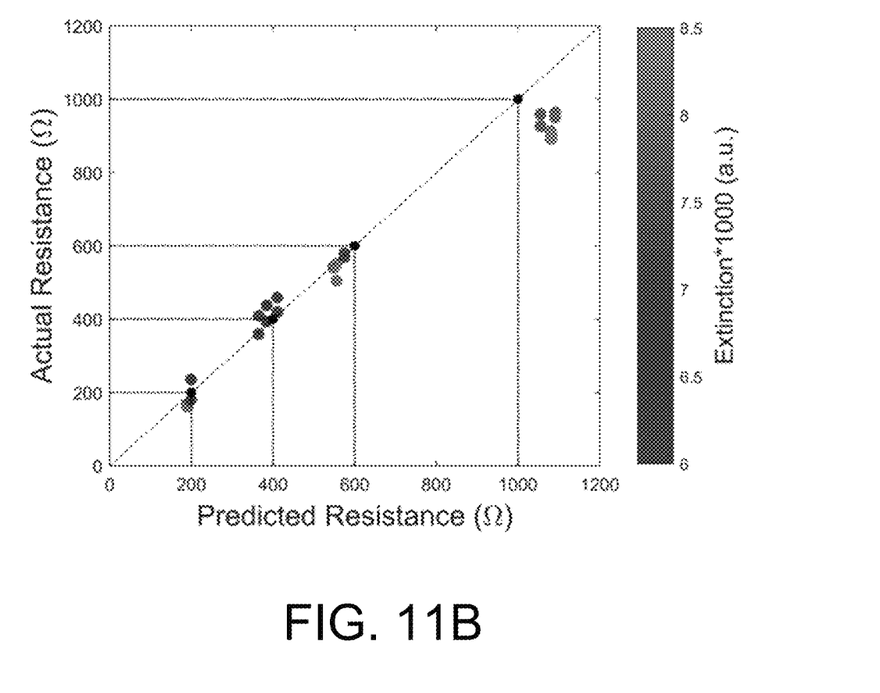
FIG. 11B is a graph of the results of the experiment for graphene resistors, showing the actual resistance plotted against predicted resistance. The dashed lines indicate the target resistance values, while the color scale illustrates that the aerosol density changed during printing, but a suitable fit to the target was maintained.

As an example, a feedback control system was implemented on a computer controlling the printer. A simple code was written to take the optical measurement an adjust the atomizer duty cycle to maintain a constant extinction value. In this example, the response was provided through the atomizer in an effort to mitigate process drift over timescales greater than a minute. A pulsed atomizer was used, in which the duty cycle was varied. In the first and third hours, no closed-loop control was in place and a constant atomizer duty cycle was maintained, as shown in FIG. 10A. The optical measurement, shown in FIG. 10B, and thickness, shown in FIG. 10C, vary with the constant atomizer duty cycle. In the second and fourth hours, closed-loop control was implemented to maintain a constant optical measurement by changing the duty cycle, resulting in more consistent film thickness, a proxy for deposition rate. Assuming a stable optical measurement baseline, this offers effective closed-loop control. To control for short-term variability in the aerosol density, changes to other printing variables, such as the gas flow rates and the print speed, can be effective.

As a simple illustration of how the closed-loop controller can be used in practice, in a manual manner for improved process control, an experiment was designed to print resistors with a target resistance value, as shown in FIG. 11A. Each resistor was composed of two printed layers. The pattern design and printing parameters were estimated based on prior experiments, and the first layer was printed. Optical measurements during printing allowed a straightforward estimate of the conductance, as well as a real-time indicator of the aerosol density. Based on these measurements, a new print speed was calculated for the second layer, assuming the same deposition rate. For example, if the first layer prints excessive material, the print speed can be increased while printing the second layer to account for the actual deposition rate. Following printing of the second layer, the overall resistance of the sample can be estimated based on the calibration measurements. This can be compared to the actual resistance following postprocessing. The results of this simple feedback-based printing are shown in FIG. 11B, showing a reasonable match between the target resistance, the predicted resistance, and the actual resistance.

The present invention has been described as an optical measurement system for real-time process monitoring of aerosol jet printing. It will be understood that the above description is merely illustrative of the applications of the principles of the present invention, the scope of which is to be determined by the claims viewed in light of the specification. Other variants and modifications of the invention will be apparent to those of skill in the art.

We claim:

1. An aerosol jet printer, comprising:

an atomizer for atomization of ink droplets, thereby providing an aerosol stream of aerosolized ink droplets;

an optical measurement system, comprising a light source, an optics cell having a region for interaction of light from the light source with the aerosol stream, and a light sensor for detecting the light scattered from or transmitted through the aerosol stream in the interaction region, thereby providing a continuous optical measurement to track an aerosol density of the aerosol stream during printing; and a printhead downstream from the optical measurement system for printing of the ink droplets on a substrate.

2. The aerosol jet printer of claim 1, further comprising a closed-loop controller that uses a process metric to control at least one process parameter in real time.

3. The aerosol jet printer of claim 2, wherein the process metric comprises the product of an aerosol flow rate and an optical extinction of the aerosol stream.

4. The aerosol jet printer of claim 2, wherein the at least one process parameter comprises an atomizer voltage, duty cycle, temperature, cartridge fill level, ink composition, aerosol flow rate, sheath gas flow rate, or print speed.

5. The aerosol jet printer of claim 1, wherein the light source provides broadband or narrowband light.

6. The aerosol jet printer of claim 1, wherein the optics cell comprises a single-pass or a double-pass optical configuration.

7. The aerosol jet printer of claim 1, wherein the optics sensor comprises a photodiode or an optical spectrometer.

8. The aerosol jet printer of claim 1, wherein the light from the light source is coupled to the interaction region by an optical fiber.

* * * * *